US012676661B2

(12) United States Patent
Wang et al.

(10) Patent No.: US 12,676,661 B2
(45) Date of Patent: Jul. 7, 2026

(54) ENHANCE DOWNLINK PERFORMANCE BY ACTIVATING RECEIVER ANTENNAS IN HIGH-SPEED ENVIRONMENT

(71) Applicant: QUALCOMM Incorporated, San Diego, CA (US)

(72) Inventors: Boting Wang, Beijing (CN); Daowei Lin, Shenzhen (CN); Xiaochen Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 18/546,153

(22) PCT Filed: Apr. 22, 2021

(86) PCT No.: PCT/CN2021/089031
§ 371 (c)(1),
(2) Date: Aug. 11, 2023

(87) PCT Pub. No.: WO2022/222107
PCT Pub. Date: Oct. 27, 2022

(65) Prior Publication Data
US 2024/0137101 A1    Apr. 25, 2024
US 2024/0235654 A9    Jul. 11, 2024

(51) Int. Cl.
*H04L 5/12*        (2006.01)
*H04B 7/08*        (2006.01)
*H04L 5/00*        (2006.01)

(52) U.S. Cl.
CPC ......... *H04B 7/0802* (2013.01); *H04L 5/0048* (2013.01)

(58) Field of Classification Search
CPC ............................ H04B 7/0802; H04L 5/0048
USPC ........................................................ 375/267
See application file for complete search history.

(56) References Cited

U.S. PATENT DOCUMENTS

| | | | |
|---|---|---|---|
| 10,256,890 B2 * | 4/2019 | Neves .................. | H04B 7/0689 |
| 11,038,648 B1 * | 6/2021 | Khayrallah .......... | H04B 7/0691 |
| 12,009,892 B2 * | 6/2024 | Ebadi Shahrivar .. | H04B 7/0608 |
| 2010/0002649 A1 * | 1/2010 | Teo ........................ | H04L 5/0048 |
| | | | 370/336 |
| 2015/0195025 A1 | 7/2015 | Kang et al. | |

(Continued)

OTHER PUBLICATIONS

International Search Report and Written Opinion—PCT/CN2021/089031—ISA/EPO—Nov. 29, 2021.

(Continued)

*Primary Examiner* — Helene E Tayong
(74) *Attorney, Agent, or Firm* — Holland & Hart LLP

(57) ABSTRACT

Methods, systems, and devices for wireless communications are described. A user equipment (UE) may receiving, from abase station, control signaling scheduling transmission of a downlink message within a wireless channel resource. The UE may select a first antenna subset of a plurality of antennas of the UE to receive the downlink message. The UE may identify that a second antenna subset of antennas of the plurality of antennas of the UE is currently available to use for receiving the downlink message based at least in part on detecting a speed environment in which the UE is operating. The UE may monitor, for downlink reception of the downlink message, the wireless channel resource using the first antenna subset and one or more antennas of the second antenna subset.

26 Claims, 11 Drawing Sheets

(56) References Cited

U.S. PATENT DOCUMENTS

| | | | |
|---|---|---|---|
| 2017/0238141 A1 | 8/2017 | Lindoff et al. | |
| 2020/0077380 A1* | 3/2020 | Hahn | H04W 72/51 |
| 2021/0076226 A1 | 3/2021 | Nakayama | |
| 2021/0306864 A1* | 9/2021 | Park | H04B 17/318 |

OTHER PUBLICATIONS

Partial International Search Report—PCT/CN2021/089031—ISA/EPO—Oct. 7, 2021.

* cited by examiner

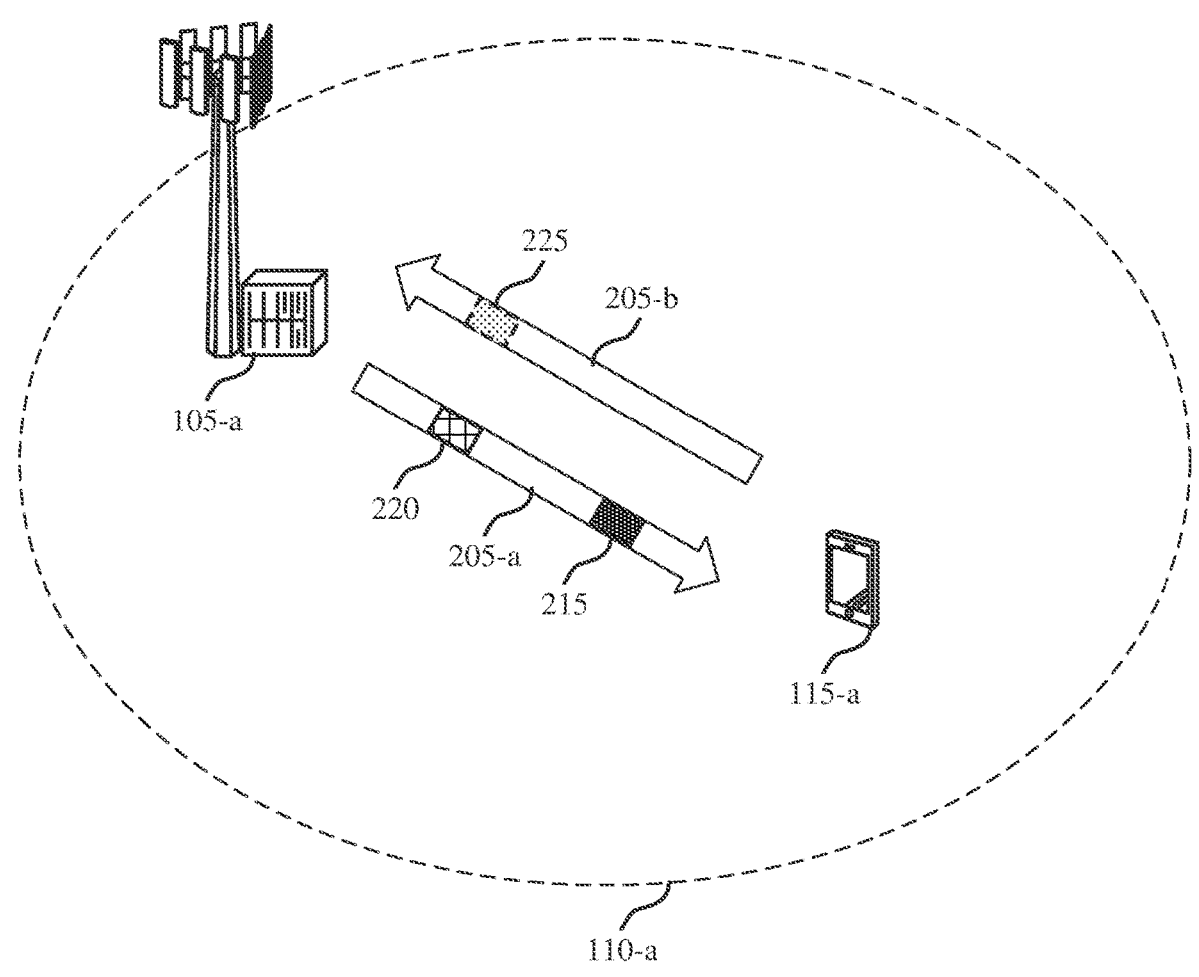
Control Signaling 215
Control Signaling 215
Downlink Message 220
Random Access Message 225
200
FIG. 2

Downlink Message 325

First Subset 315-a/b

Second Subset 320-a/b

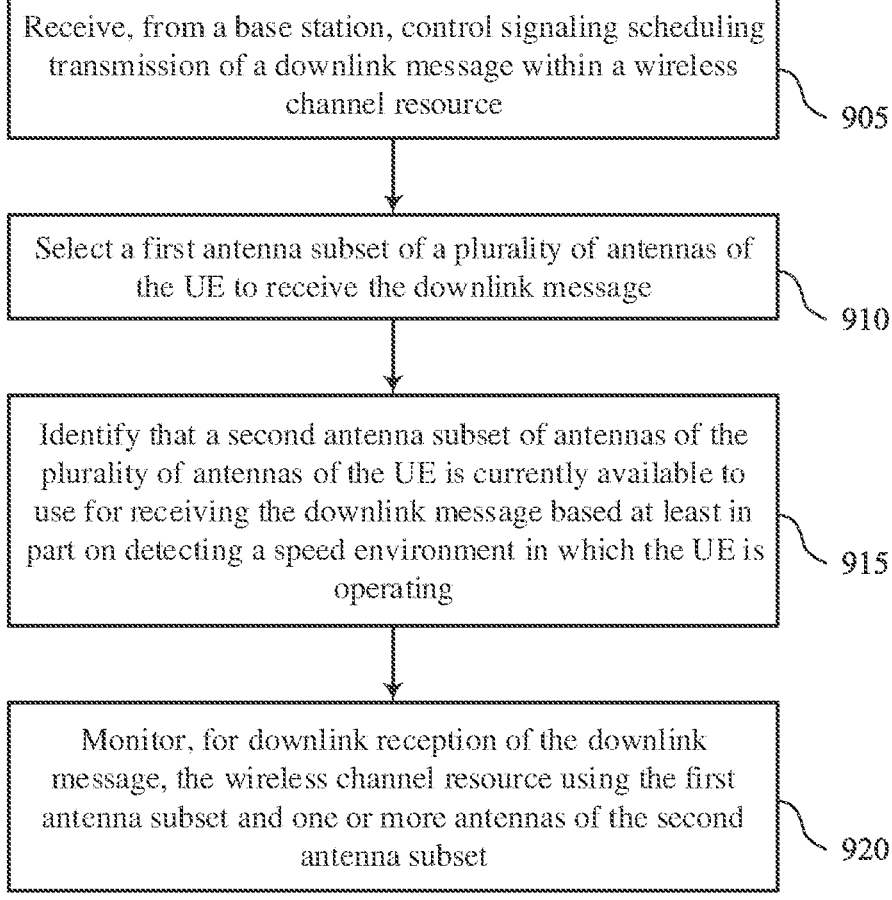

Receive, from a base station, control signaling scheduling transmission of a downlink message within a wireless channel resource

905

Select a first antenna subset of a plurality of antennas of the UE to receive the downlink message

910

Identify that a second antenna subset of antennas of the plurality of antennas of the UE is currently available to use for receiving the downlink message based at least in part on detecting a speed environment in which the UE is operating

915

Monitor, for downlink reception of the downlink message, the wireless channel resource using the first antenna subset and one or more antennas of the second antenna subset

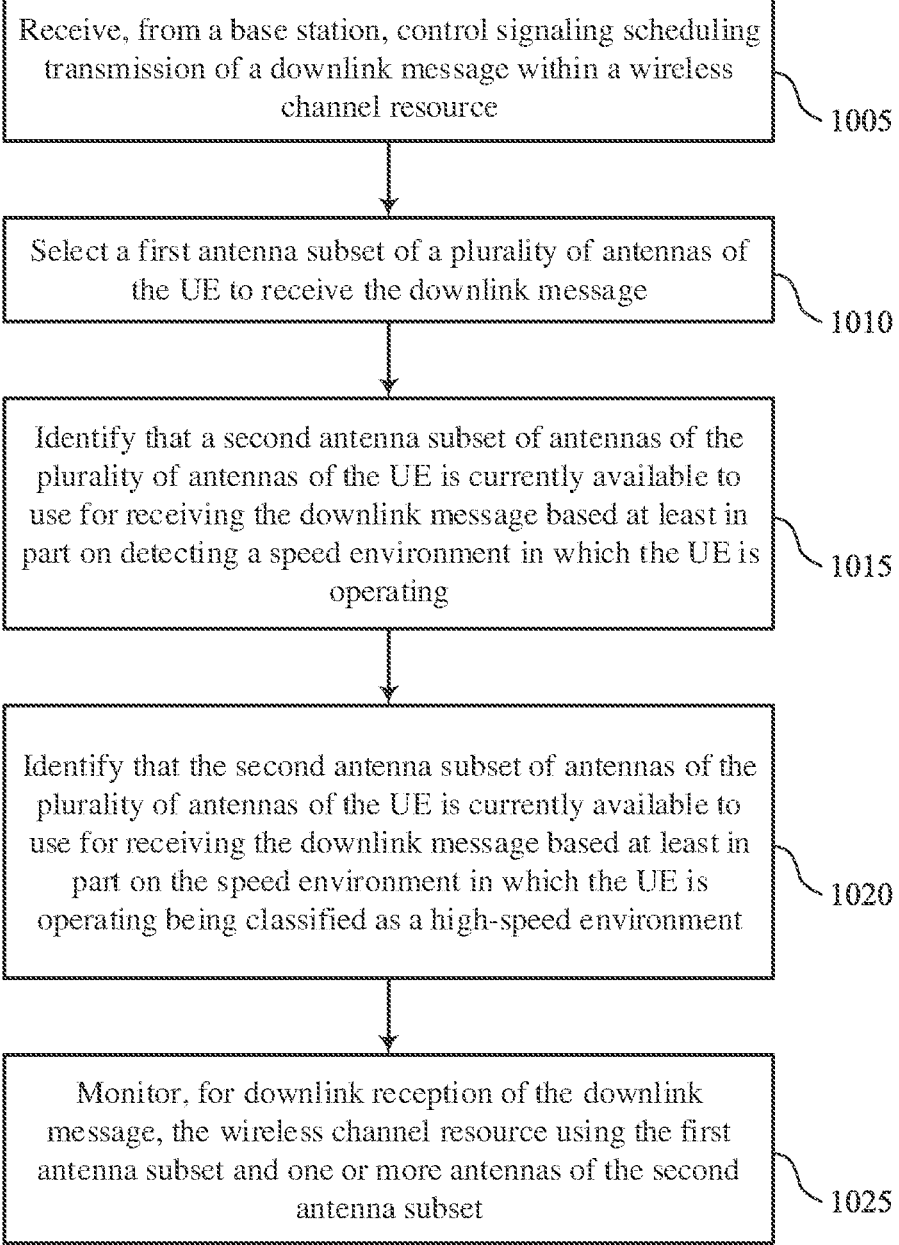

Receive, from a base station, control signaling scheduling transmission of a downlink message within a wireless channel resource ⟍ 1005

Select a first antenna subset of a plurality of antennas of the UE to receive the downlink message ⟍ 1010

Identify that a second antenna subset of antennas of the plurality of antennas of the UE is currently available to use for receiving the downlink message based at least in part on detecting a speed environment in which the UE is operating ⟍ 1015

Identify that the second antenna subset of antennas of the plurality of antennas of the UE is currently available to use for receiving the downlink message based at least in part on the speed environment in which the UE is operating being classified as a high-speed environment ⟍ 1020

Monitor, for downlink reception of the downlink message, the wireless channel resource using the first antenna subset and one or more antennas of the second antenna subset ⟍ 1025

ENHANCE DOWNLINK PERFORMANCE BY ACTIVATING RECEIVER ANTENNAS IN HIGH-SPEED ENVIRONMENT

CROSS REFERENCE

The present application is a 371 national stage filing of International PCT Application No. PCT/CN2021/089031 by WANG et al. entitled "ENHANCE DOWNLINK PERFORMANCE BY ACTIVATING RECEIVER ANTENNAS IN HIGH-SPEED ENVIRONMENT," filed Apr. 22, 2021, which is assigned to the assignee hereof, and which is expressly incorporated by reference in its entirety herein.

FIELD OF TECHNOLOGY

The following relates to wireless communications, including antenna management for downlink performance in a high-speed environment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, a wireless device may receive downlink transmissions in a variety of environments. A wireless device may receive downlink transmissions while moving, which may include reception in a high-speed scenario. Conventional methods for downlink reception by a moving wireless device may be deficient.

SUMMARY

The described techniques relate to improved methods, systems, devices, and apparatuses that support enhance downlink performance by activating receiver antennas when operating in a high-speed environment. Generally, the described techniques provide for methods for controlling activation of antennas of a user equipment (UE) when performing reception in a high-speed environment. The UE may receive control signaling (e.g., downlink control information (DCI)) from a base station that may schedule transmission of a downlink message within a wireless channel resource. The UE may select a first antenna subset of a plurality of antennas of the UE to receive the downlink message. The UE may detect that the UE is operating in a high-speed environment, and may identify that a second antenna subset of antennas of the plurality of antennas of the UE is currently available to use for receiving the downlink message while in the high-speed environment. The UE monitor the wireless channel resource using the first antenna subset and one or more antennas of the second antenna subset. Thus, the UE may select to use additional antennas when detected to operate in a high-speed environment to enhance the likelihood of successful reception of the downlink message.

A method for wireless communications at a user equipment (UE) is described. The method may include receiving, from a base station, control signaling scheduling transmission of a downlink message within a wireless channel resource, selecting a first antenna subset of a set of multiple antennas of the UE to receive the downlink message, identifying that a second antenna subset of antennas of the set of multiple antennas of the UE is currently available to use for receiving the downlink message based on detecting a speed environment in which the UE is operating, and monitoring, for downlink reception of the downlink message, the wireless channel resource using the first antenna subset and one or more antennas of the second antenna subset.

An apparatus for wireless communications at a UE is described. The apparatus may include a processor, memory coupled with the processor, and instructions stored in the memory. The instructions may be executable by the processor to cause the apparatus to receive, from a base station, control signaling scheduling transmission of a downlink message within a wireless channel resource, select a first antenna subset of a set of multiple antennas of the UE to receive the downlink message, identify that a second antenna subset of antennas of the set of multiple antennas of the UE is currently available to use for receiving the downlink message based on detecting a speed environment in which the UE is operating, and monitor, for downlink reception of the downlink message, the wireless channel resource using the first antenna subset and one or more antennas of the second antenna subset.

Another apparatus for wireless communications at a UE is described. The apparatus may include means for receiving, from a base station, control signaling scheduling transmission of a downlink message within a wireless channel resource, means for selecting a first antenna subset of a set of multiple antennas of the UE to receive the downlink message, means for identifying that a second antenna subset of antennas of the set of multiple antennas of the UE is currently available to use for receiving the downlink message based on detecting a speed environment in which the UE is operating, and means for monitoring, for downlink reception of the downlink message, the wireless channel resource using the first antenna subset and one or more antennas of the second antenna subset.

A non-transitory computer-readable medium storing code for wireless communications at a UE is described. The code may include instructions executable by a processor to receive, from a base station, control signaling scheduling transmission of a downlink message within a wireless channel resource, select a first antenna subset of a set of multiple antennas of the UE to receive the downlink message, identify that a second antenna subset of antennas of the set of multiple antennas of the UE is currently available to use for receiving the downlink message based on detecting a speed environment in which the UE is operating, and monitor, for downlink reception of the downlink message, the wireless channel resource using the first antenna subset and one or more antennas of the second antenna subset.

In some examples of the method, apparatuses, and non-transitory computer-readable medium described herein, detecting the speed environment may include operations, features, means, or instructions for receiving a control message indicating the speed environment in which the UE may be operating.

Some examples of the method, apparatuses, and non-transitory computer-readable medium described herein may further include operations, features, means, or instructions for receiving the downlink message using one or more antennas of the first antenna subset, the second antenna subset, or both, based on the monitoring.

Some examples of the method, apparatuses, and non-transitory computer-readable medium described herein may further include operations, features, means, or instructions for transmitting a random access message of a random access procedure, where the downlink message may be a random access response message of the random access procedure.

In some examples of the method, apparatuses, and non-transitory computer-readable medium described herein, monitoring the wireless channel resource may include operations, features, means, or instructions for monitoring the wireless channel resource using all antennas of the second antenna subset based on detecting that the UE operating in the speed environment.

In some examples of the method, apparatuses, and non-transitory computer-readable medium described herein, monitoring the wireless channel resource may include operations, features, means, or instructions for monitoring the wireless channel resource using one or more antennas of the second antenna subset that may be activated based on the UE operating in an initial access state.

In some examples of the method, apparatuses, and non-transitory computer-readable medium described herein, monitoring the wireless channel resource may include operations, features, means, or instructions for monitoring the wireless channel resource using one or more antennas of the second antenna subset that may be activated based on the UE operating in a connected state.

In some examples of the method, apparatuses, and non-transitory computer-readable medium described herein, identifying that the second antenna subset of antennas of the set of multiple antennas of the UE may be currently available may include operations, features, means, or instructions for identifying that the second antenna subset of antennas of the set of multiple antennas of the UE may be currently available to use for receiving the downlink message based on the speed environment in which the UE may be operating being classified as a high-speed environment.

Some examples of the method, apparatuses, and non-transitory computer-readable medium described herein may further include operations, features, means, or instructions for deactivating one or more antennas of the second antenna subset based on the detecting that the UE may be no longer operating in the speed environment that may be classified as a high-speed environment.

Some examples of the method, apparatuses, and non-transitory computer-readable medium described herein may further include operations, features, means, or instructions for identifying a maximum number of antennas available at the UE based on a hardware capability of the UE and monitoring the wireless channel resource using the maximum number of antennas available at the UE.

Some examples of the method, apparatuses, and non-transitory computer-readable medium described herein may further include operations, features, means, or instructions for identifying the second antenna subset may be based on identifying the maximum number of antennas of the UE.

In some examples of the method, apparatuses, and non-transitory computer-readable medium described herein, detecting the speed environment may include operations, features, means, or instructions for detecting the speed environment based on a mobility sensor of the UE.

In some examples of the method, apparatuses, and non-transitory computer-readable medium described herein, detecting the speed environment may include operations, features, means, or instructions for receiving network system information indicating that the UE may be operating in the speed environment.

Some examples of the method, apparatuses, and non-transitory computer-readable medium described herein may further include operations, features, means, or instructions for decoding the downlink message based on performing soft-combining of each signal received via the wireless channel resource at a respective antenna of the first antenna subset and the second antenna subset.

BRIEF DESCRIPTION OF THE DRAWINGS

FIG. 2 illustrates an example of a wireless communication system that supports enhance downlink performance by activating receiver antennas in high-speed environment in accordance with aspects of the present disclosure.

FIGS. 9 through 11 show flowcharts illustrating methods that support enhance downlink performance by activating receiver antennas in high-speed environment in accordance with aspects of the present disclosure.

DETAILED DESCRIPTION

In wireless communications, a user equipment (UE) may be used in a variety of different speed environments. For example, a UE may be used while a person is seated in a building and a UE may also be used while on a high-speed train. In some approaches, various speed scenarios are not treated any differently. For example, an antenna configuration that uses some, but not all, of the antennas of the UE may be utilized in both a stationary scenario and a high-speed travel scenario. This may cause problems such as data loss, higher latency for data reception, or loss of connection, particularly under demands for continuous downlink data transmission when reception is being performed in the high-speed travel scenario. Conventional approaches do not provide a mechanism to adjust an antenna configuration of the UE to account for different speed environments in which a UE may be operating, such as high-speed environments.

To increase communication reliability and reduce latency, additional antennas may be activated and used for downlink reception when the UE is operating in a high speed environment. The UE may identify a speed environment by using a mobility sensor or by receiving signaling explicitly indicating the high speed environment. The UE may identify one or more additional antennas that are available for use, and activate one or more of those antennas in addition to antennas already configured for downlink reception. In some cases, the UE may activate a maximum number of antennas that the UE has. Activating these additional antennas may increase initial access success rates, as well as downlink data transmission success rates.

Aspects of the disclosure are initially described in the context of wireless communications systems. Aspects of the disclosure are then illustrated by system diagrams of wireless communications systems, and a process flow Aspects of the disclosure are further illustrated by and described with reference to apparatus diagrams, system diagrams, and flowcharts that relate to enhance downlink performance by activating receiver antennas in high-speed environment.

Figure 1:
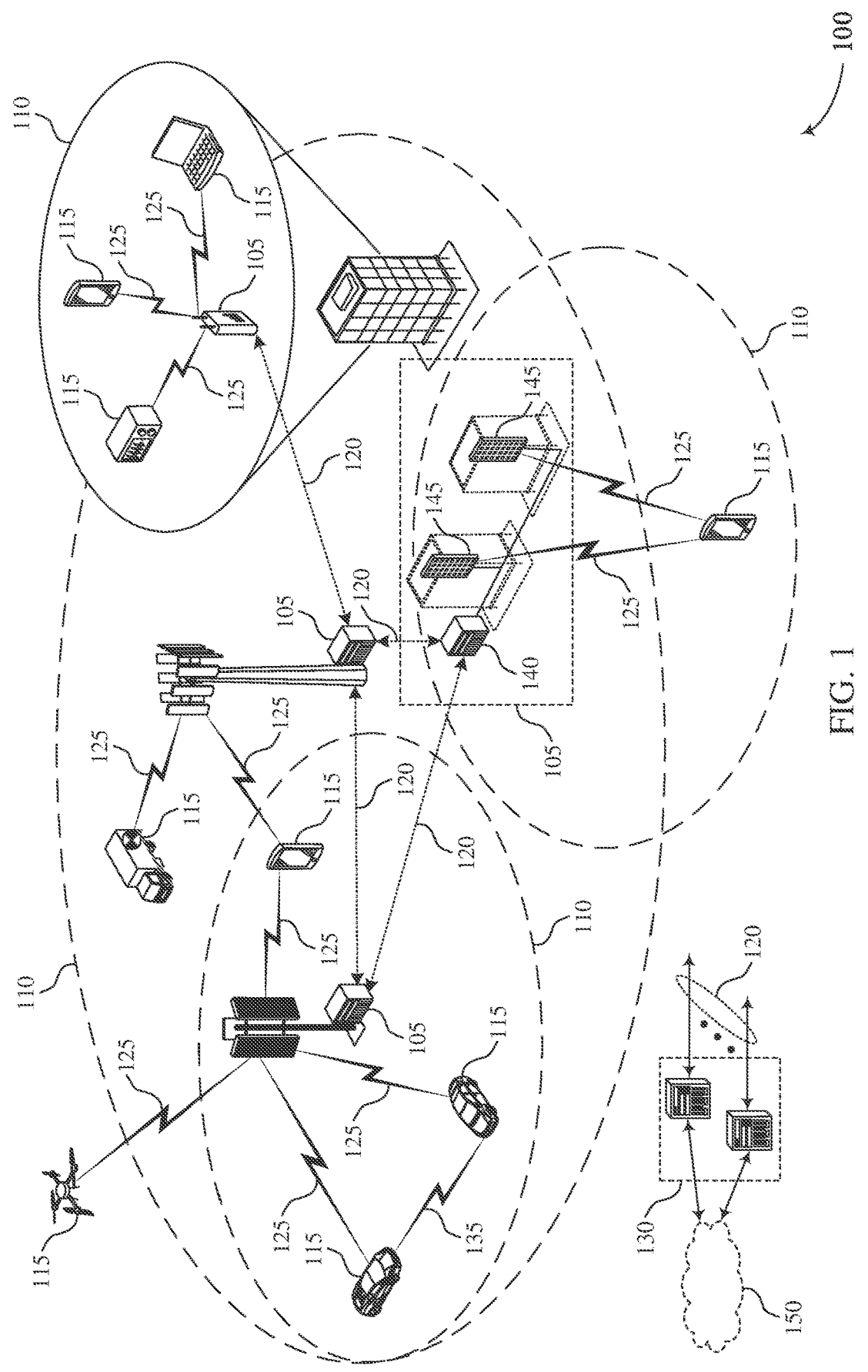
FIG. 1 illustrates an example of a wireless communications system that supports enhance downlink performance by activating receiver antennas in high-speed environment in accordance with aspects of the present disclosure.

FIG. 1 illustrates an example of a wireless communications system 100 that supports enhance downlink performance by activating receiver antennas in high-speed environment in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless devices may implement one or more techniques for managing downlink performance in a speed scenario. For example, a UE 115 may receive control signaling (e.g., downlink control information (DCI)) from a base station that may schedule transmission of a downlink message within a wireless channel resource. The UE may select a first antenna subset of a plurality of antennas of the UE to receive the downlink message. The UE may identify that a second antenna subset of antennas of the plurality of antennas of the UE is currently available to use for receiving the downlink message based on detecting a speed environment (e.g., a high-speed environment) in which the UE is operating. The UE monitor the wireless channel resource for downlink reception of the downlink message. The UE monitor the wireless channel resource using the first antenna subset and one or more antennas of the second antenna subset.

FIG. 2 illustrates an example of a wireless communications system 200 that supports enhance downlink performance by activating receiver antennas in high-speed environment in accordance with aspects of the present disclosure. The wireless communications system 200 may include a base station 105-*a* that may be an example of the base station 105 discussed in relation to FIG. 1. The wireless communications system 200 may include UE 115-*a* that may be an example of the UEs 115 discussed in relation to FIG. 1. In some examples, the base station 105-*a* and the UE 115 a may be located in a geographic coverage area 110-*a*. The base station 105-*a* may communicate with the UE 115-*a* via one or more downlink communication links 205-*a* and one or more uplink communication links 205-*b*.

In some examples, the UE 115-*a* may support a range of advanced receiver options. For example, a UE 115-*a* may have multiple available antennas (e.g. four available antennas). In other UEs 115-*a*, a different number of antennas may be available. The number of available antennas may depend on a hardware capability of the UE 115-*a*.

In some examples, the UE 115-*a* may manage the use of its various antennas. For example, the UE 115-*a* may use a number of antennas in a first context, and may use another number of antennas in another context. The management of antennas may provide a power-performance tradeoff. For example, if the UE 115-*a* uses more antennas, the UE 115-*a* may consume more power and may have increased communication performance (e.g. increased transmission or reception capability, increased reliability, or other performance increases). If the UE 115-*a* uses fewer antennas, then the UE 115-*a* may consume less power, but transmission performance, reception performance, or both, may be impacted.

In some examples, the UE 115-*a* may be moving at a high speed, such as when located on or in a high-speed train. In such a scenario, the UE 115-*a* may experience reduced performance because of a high amount of the mobility. The UE's 115-*a* reduction in performance may be greater under the demands of continuous downlink data transmission.

However, the UE 115-*a* may utilize a mobility sensor to detect or determine a speed scenario (e.g. a high-speed scenario, a low-speed scenario, a stationary scenario, a variable-speed scenario, or another speed scenario). Each of the speed scenarios may be associated with a particular range of speeds, and the base station 105-*a* may configure the UE 115-*a*, or the UE 115-*a* more be preconfigured with, one or more thresholds for identifying the respective speed scenarios. Alternatively, or, additionally, the UE 115-*a* may receive network system information indicating a speed scenario (e.g. a high-speed scenario, a low-speed scenario, a stationary scenario, a variable-speed scenario, or another speed scenario).

In such scenarios (e.g. a high-speed scenario), the UE 115-*a* may enable one or more additional antennas or a maximum number of antennas for use during a random access procedure to increase a success rate when initiating initial access for requesting connection establishment with base station 105-*a*. For example, the UE 115-*a* may initiate a 4 step random access procedure where the UE transmits MSG 1 and MSG 3 and receives MSG 2 or MSG 4 as part of a handshake to establish a connection with base station 105-*a*. When operating in a high-speed scenario, the UE 115-*a* may enable up to a maximum number antennas for reception of either or both of MSG 2 or MSG 4 downlink messages in the random access procedure. In some examples, enabling a maximum number of antennas may increase the likelihood of the UE receiving one or both of MSG 2 or MSG 4 and thus a rate of successfully completing initial access when performing the random access procedure.

In some examples, the UE 115-*a* may enable up to a maximum number of antennas for reception of a downlink message when operating in a high-speed scenario. In some examples, enabling a maximum number of antennas may increase a success rate of downlink message decoding. In some examples, the UE 115-*a* may receive control signaling 215, which may be transmitted from the base station 105-*d* (e.g., DCI, RRC signaling, or other control signaling). In some examples, the control signaling 215 may schedule transmission of a downlink message 220 over one or more wireless channel resources. In some examples, the UE 115-*a* may monitor the one or more wireless channel resources for downlink reception of the downlink message 220. In some examples, the UE 115-*a* may receive the downlink message 220 using a first antenna subset, a second antenna subset, or both, and such reception of the downlink message 220 may be based on the UE 115-*a* monitoring the one or more wireless channel resources. In some examples, the downlink message 220 may be an individual data message, or it may be part of a series of continuous downlink transmissions (e.g., downlink messages associated with streaming video, for example).

In some examples, the UE 115-*a* may receive control signaling 215 that may indicate a speed environment in which the UE 115-*a* is operating. For example, the base station 105-*a* may indicate to the UE 115-*a* through the control signaling 215 that the UE 115-*a* is operating in a high-speed environment (e.g., travelling on a high-speed train). Such an indication may be made through a system information block (SIB) (e.g. SIB2). Additionally, or alternatively, the base station 105-*b* may indicate that a flag is set to a defined value (e.g., highspeedflag) in the control signaling 215 to indicate that the UE 115-*a* is operating in the high-speed scenario. In other examples, the base station 105-*a* may indicate to the UE 115-*a* that the speed environment in which the UE 115-*a* is operating may be a low-speed environment (e.g., a user of the UE 115-*a* may be walking or running) or a stationary environment (e.g., a user of the UE 115-*a* may be seated in a building). Similarly, the base station 105-*b* may indicate another flag in the control signaling to indicate a different speed scenario (e.g., a lowspeedflag for a low speed scenario, a variablespeed flag for a variable speed scenario, or a stationaryflag for a stationary scenario). Additionally, or alternatively, the UE 115-*a* may receive network system information that indicates that the UE 115-*a* may be operating in a speed environment.

In some examples, the UE 115-*a* may be operating in a context of established communication. For examples, the UE 115-*a* may be operating in a connected mode in which uplink and downlink transmissions occur regularly. In some examples, the UE 115-*a* may be operating in a context where the UE 115-*a* may be establishing contact with the base station 105-*a*. For example, the UE 115-*a* may perform a random access procedure during initial access to establish a connection with base station 105-*a*. As part of such a procedure, the UE 115-*a* may transmit a random access message 225 to the base station 105-*a* to initiate establishment of a connection with the base station 105-*a*. In some examples involving a random access procedure, the base station 105-*a* may transmit a downlink message 220 to the UE 115-*a* in reply to the random access message 225, and the downlink message 220 may be a random access response message of the random access procedure, wherein the UE 115-*a* increases the number of antennas used to receive the random access response message when operating in a high speed environment.

In some examples, the UE 115-*a* may operate in a power-saving mode (e.g. a mode in which antenna toggling is performed to save power). If the UE 115-*a* detects or determines that the UE 115-*a* is operating in a high-speed environment, for example, the UE 115-*a* may activate one or more additional antennas as described herein for receiving a downlink message, and the UE 115-*a* may no longer operate in a power-saving mode, since the use of additional antennas may use additional power. In some examples, if the UE 115-*a* detects or determines that the UE 115-*a* is no longer operating in the high-speed environment, the UE 115-*a* may deactivate the additionally activated antennas, and may resume operating in the power-saving mode (e.g. a mode in which antenna toggling or an antenna algorithm is performed to save power expended by the UE 115-*a*).

In some examples, if the UE 115-*a* detects or determines a speed scenario (e.g. a high-speed scenario detected using a mobility sensor), the UE 115-*a* may notify a non-standalone (NSA) at layer one (L1) to update a current speed environment state (e.g., change the speed environment state to indicate that the UE 115-*b* is operating in a high-speed scenario). The NSA L1 of UE 115-*a* may be a hardware or software component of the UE 115-*a* that manages activation of antennas of the UE 115-*a* based on the current speed environment state and the communication mode (e.g., idle mode, connected mode) in which the UE 115-*a* is currently operating. In some examples, the NSA L1 may check if the UE 115-*a* is in an inactive or idle mode. If the UE 115-*a* is in an inactive or idle mode, the NSA L1 may not activate one or more additional antennas, even though the stored speed environment state may indicate that the UE 115-*a* is operating in a high-speed environment. If the UE 115-*a* is in an active or connected mode, the NSA L1 may activate one or more additional antennas (e.g. for reception of the downlink message 220) when the stored speed environment state indicates that the UE 115-*a* is in a high-speed scenario. In such an example, the UE 115-*a* is using extra power to operate the additional antennas for downlink reception.

In some examples, if the UE 115-*a* detects or determines that the UE 115-*a* is no longer operating in the speed scenario, the UE 115-*a* may notify the NSA L1. The NSA L1 may then update the stored speed environment state to indicate that the UE 115-*a* is not operating in a high-speed environment. In such an example, the UE 115-*a* may disactivate the additional antennas to save power.

In one example, when the UE 115-*a* has decided to trigger initial access, the NSA L1 may identify the stored speed environment state for determining whether to enable additional antennas. For example, the NSA L1 of the UE 115-*a* may identify that the UE is operating in a high-speed environment and that four antennas are available. In such an example, the NSA L1 may enable up to each of the four antennas for reception of the downlink message 220 (e.g., MSG 2 or MSG 4 of a 4 step random access channel (RACH) procedure). If the NSA L1 determines that only two antennas are available, then the NSA L1 may enable those two antennas for reception of the downlink message 220.

In another example, when operating in connected mode, NSA L1 may identify the stored speed environment state for determining whether to enable additional antennas. For example, the NSA L1 may identify the stored speed environment state and may determine that four antennas are available. When the stored speed environment state indicates that the UE 115-*a* is operating in a high-speed environment, the NSA L1 may enable additional antennas when the UE 115-*a* is scheduled to receive a downlink message 220. For example, the UE 115-*a* may receive a grant scheduling the downlink message 220, and the NSA L1 may enable up to four antennas for reception of the downlink message 220. If the NSA L1 determines that only two antennas are available, then the NSA L1 may enable those two antennas for reception of the downlink message 220.

In another example, the UE 115-*a* may determine or detect that the UE 115-*a* is no longer operating in a high speed scenario, and the UE 115-*a* may notify the NSA L1 that the UE 115-*a* is no longer operating in the high speed scenario. In some examples, the NSA L1 may clean up the state (e.g. the NSA L1 may store a speed environment state that indicates that the UE 115-*a* is not operating in a high-speed environment), and the NSA L1 of the UE 115-*a* may resume an antenna algorithm or procedure that does not attempt to activate one or more additional antennas (e.g. the NSA L1 may employ an antenna toggling algorithm or procedure, a power saving algorithm or procedure, or another algorithm or procedure).

Figure 3:
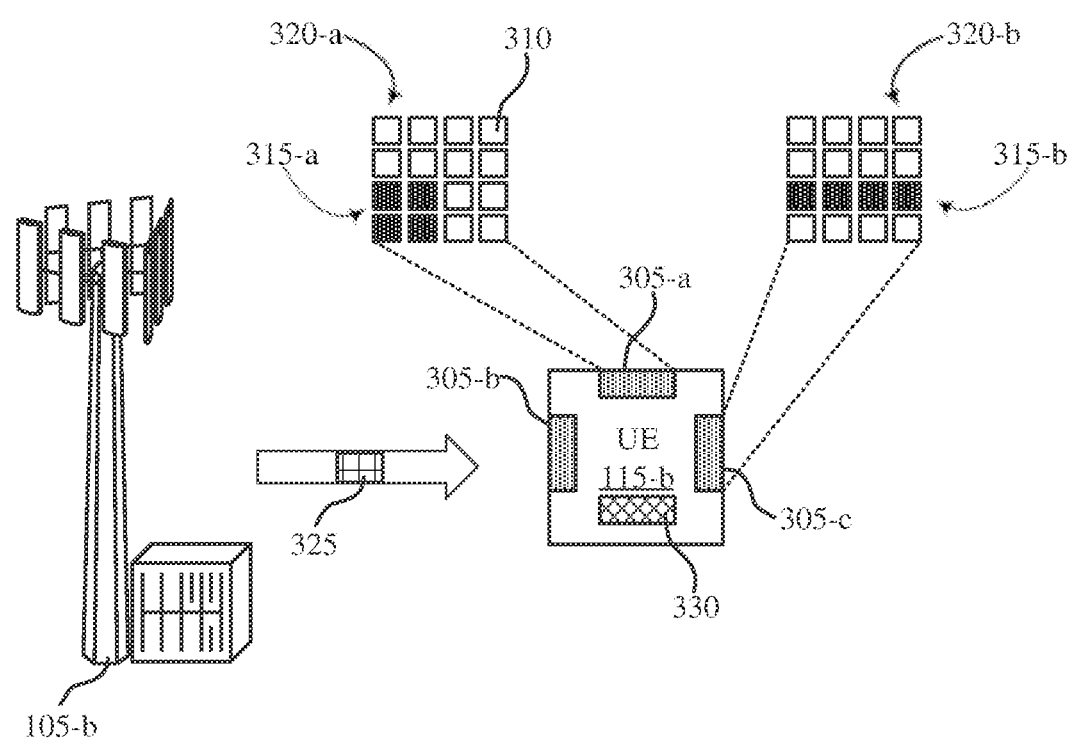
FIG. 3 illustrates an example of a wireless communication system that supports enhance downlink performance by activating receiver antennas in high-speed environment in accordance with aspects of the present disclosure.

FIG. 3 illustrates an example of a wireless communications system 300 that supports enhance downlink performance by activating receiver antennas in high-speed environment in accordance with aspects of the present disclosure. The wireless communications system 300 may include a base station 105-*b* that may be an example of the base station 105 discussed in relation to FIG. 1. The wireless communications system 300 may include UE 115-*b* that may be an example of the UE 115 discussed in relation to FIG. 1. In some examples, the base station 105-*b* may be located in a geographic coverage area 110-*b*.

In some examples, the UE 115-*b* may include one or more antenna panels 305, such as antenna panels 305-*a*, 305-*b*, and 305-*c*. Each antenna panel 305 may include one or more antennas 310 located on an antenna panel 305. In some examples, the various antennas 310 may be organized into one or more subsets, and each subset may include antennas 310 from one or more antenna panels 305. For example, one or more of the antennas 310 may be designated as belonging to a first antenna subset 315-*a/b* and a second antenna subset 320-*a/b*. In some examples, the first antenna subset 315 may include one or more antennas 310 from one or more antenna panels 305. For example, the first antenna subset 315-*a/b* may include the antennas designated in FIG. 3 as the first antenna subset 315-*a* from antenna panel 305-*a* and antennas designated as the first antenna subset 315-*b* from antenna panel 305-*c*. Similarly, in some examples, the second antenna subset 320-*a/b* may include one or more antennas 310 from one or more antenna panels 305. For example, the second antenna subset 320 may include the antennas designated as the second antenna subset 320-*a* from antenna panel 305-*a* and antennas designated as the second antenna subset 320-*b* from antenna panel 305-*c*.

For example, the NSA L1 of the UE 115-*b* may schedule to use each of the antennas in the first antenna subset 315-*a* of the antenna panel 305-*a* and the first antenna subset 315-*b* of the antenna panel 305-*c* to receive the downlink message 325. The UE 115-*b* may detect that the UE 115-*b* is operating in a high-speed environment, and the NSA L1 of the UE 115-*b* may identify that one or more antennas in the second antenna subset 320-*a*, the second antenna subset 320-*b*, or both, are available for reception of the downlink message 325. The NSA L1 of the UE 115-*b* may activate the one or more identified antennas (e.g. one or more antennas in the second antenna subset 320-*a*, the second antenna subset 320-*b*, or both) for reception of the downlink message 325 due to the UE 115-*a* operating in the high speed environment. By activating one or more additional antennas, the UE 115-*b* may have increased performance (e.g. increased transmission or reception capability, increased reliability, or other performance increases).

In some examples, the NSA L1 of the UE 115-*b* may detect that the UE 115-*b* is no longer operating the high speed environment or that the additionally activated antennas are no longer needed (e.g., the UE transitioned from a connected mode to idle mode). In either case, the UE 115-*b* may deactivate the one or more antennas that were activated for use during the high-speed scenario (e.g. the one or more antennas in the second antenna subset 320-*a*, the second antenna subset 320-*b*, or both that were activated for reception of the downlink message 325). By doing so, the UE 115-*b* may have increased power performance or efficiency, since fewer antennas may be used for transmission or reception. In some examples, the UE 115-*b* may include a mobility sensor 330. In some examples, the UE 115-*b* may use the mobility sensor 330 to determine a speed scenario in which the UE 115-*b* may be operating. For example, the UE 115-*b* may detect or determine, using the mobility sensor 330, that the UE 115-*b* is moving at a speed that at least meets a speed threshold. The UE 115-*b* may determine that the UE 115-*b* is operating in a high-speed scenario based on the detection or determination of the speed that at least meets a speed threshold. For example, each of the speed scenarios may be associated with a particular range of speeds, and the base station 105-*a* may configure the UE 115-*a*, or the UE 115-*a* more be preconfigured with, one or more speed thresholds for identifying the respective speed scenarios.

As described herein, the UE 115-*b* may receive control signaling (e.g., control signaling 215 described in relation to FIG. 2) scheduling transmission of a downlink message (e.g., downlink message 325). In some examples, the UE 115-*b* may select the first antenna subset 315 of antennas to use for reception of the downlink message 325. In some examples, the UE 115-*b* may identify that the second antenna subset of antennas may be available for use (e.g., for receiving the downlink message 325). For example, the UE 115-*b* may identify that the second antenna subset of antennas may be available for use to receive the downlink message 325 based on a speed environment in which the UE 115-*b* may be operating and based on the UE 115-*b* operating in a particular communication mode (e.g., connected mode). In some examples, the UE 115-*b* may identify that the second antenna subset is available based on the speed environment being classified as a high-speed environment. For example, the UE 115-*b* may be in motion at a speed greater than a speed threshold, and the UE 115-*b* may determine that the speed being greater than the threshold indicates a high-speed environment. In another example, the base station 105-*b* may transmit a control message indicating that the UE 115-*a* is operating in a high-speed environment.

In some examples, the UE 115-*b* may monitor a wireless channel resource using the first antenna subset 315 of antennas and one or more antennas 310 of the second antenna subset. In some examples, the UE 115-*b* may use all of the antennas 310 included in the second antenna subset to monitor for the downlink message 325 (e.g., the UE 115-*b* may utilize all of the antennas 310 available for monitoring or reception). In some examples, the UE 115-*b* may identify a maximum number of antennas available at the UE 115-*b*, and such an identification may be based on a hardware capability of the UE 115-*b*. In further examples, the UE 115-*b* may utilize the maximum number of antennas 310 for monitoring one or more wireless channel resources or for reception of the downlink message 325.

For example, when the UE 115-*b* detects or determines a speed scenario (e.g. a high speed scenario), the UE 115-*b* may notify an NSA L1 of the speed scenario. In some examples, the NSA L1 may enter a speed environment state (e.g. a speed environment state indicating that the UE 115-*b* is operating in a high-speed environment) and may check a current procedure or operating mode. If, for example, the UE 115-*b* is in an inactive or idle mode, the NSA L1 may take no further action. For example, if the NSA L1 is in an inactive or idle mode, there may be no need for the NSA L1 to allocate additional antennas, since the UE 115-*b* may not, for example, be scheduled to receive a downlink message 325. If, for example, the NSA L1 is triggering an initial access mode or the UE 115-*b* is in a connected mode, the NSA L1 may enable one or more available antennas, or may enable all available antennas for reception of a downlink message (e.g. a random access response message, such as MSG 2 or MSG 4, or a downlink message, such as a downlink message that is part of a series of continuous downlink messages). In some examples, the UE 115-*b* may notify the NSA L1 that the UE 115-*b* is no longer operating in the high-speed scenario, the NSA L1 may clean up the speed environment state (e.g. the NSA L1 may store a speed environment state that indicates that the UE 115-*b* is not operating in a high-speed environment), and the NSA L1 may enter another speed environment state (e.g. a speed environment state that indicates that the UE 115-*b* is not operating in a high-speed scenario) that may include algorithms or procedures employed to save power.

In some examples, the UE 115-*b* may monitor one or more wireless channel resources based on the UE 115-*b* operating in a connected mode (e.g., the UE 115-*b* may be transmitting or receiving data, or both, in a connected mode, such as in a situation when the UE 115-*b* may be receiving streaming video, for example).

In some examples, the UE 115-*b* may receive the downlink message 325 using the first antenna subset 315 of antennas and one or more antennas of the second antenna subset. In some examples, the UE 115-*b* may receive the downlink message 325 based on the monitoring of the wireless channel resource using the first antenna subset 315 of antennas and one or more antennas of the second antenna subset.

In some examples, the UE 115-*b* may be operating in an initial access mode. In such a mode, the UE 115-*b* may transmit a random access message (e.g., a random access message that may be part of a random access procedure) to the base station 105-*b*. The base station 105-*b* may transmit the downlink message 325 in response to the random access message, in which case the downlink message 325 may be a random access response message of a random access procedure. In some examples, the UE 115-*b* may monitor one or more wireless channel resources for reception of the downlink message 325 (e.g., a random access response message of a random access procedure) based on the UE 115-*b* operating in an initial access mode.

In some examples, the UE 115-*b* may operate in a high-speed scenario, and, after a time, may no longer operate in the high-speed scenario. For example, if a UE 115-*b* is located on a high-speed train, and the high-speed train slows down, a speed scenario may be changed or end. In such a situation, the UE 115-*b* may deactivate one or more antennas of the second antenna subset based on detecting or receiving an indication that the UE 115-*b* is no longer operating in the speed scenario.

In some examples, the UE 115-*b* may decode the downlink message 325. For example, the UE 115-*b* may decode the downlink message 325 based on a soft-combining of each signal received at an antenna 310 of the first antenna subset 315 and an antenna 310 of the second antenna subset. For example, the UE 115-*b* may determine soft bits from signal energy received at different antennas and combine the soft bits during decoding of received signal energy. Utilizing signal energy received at different antennas may enhance decoding performance including, for example, when signal energy is blocked or otherwise obstructed at one antenna but not at another antenna.

Figure 4:
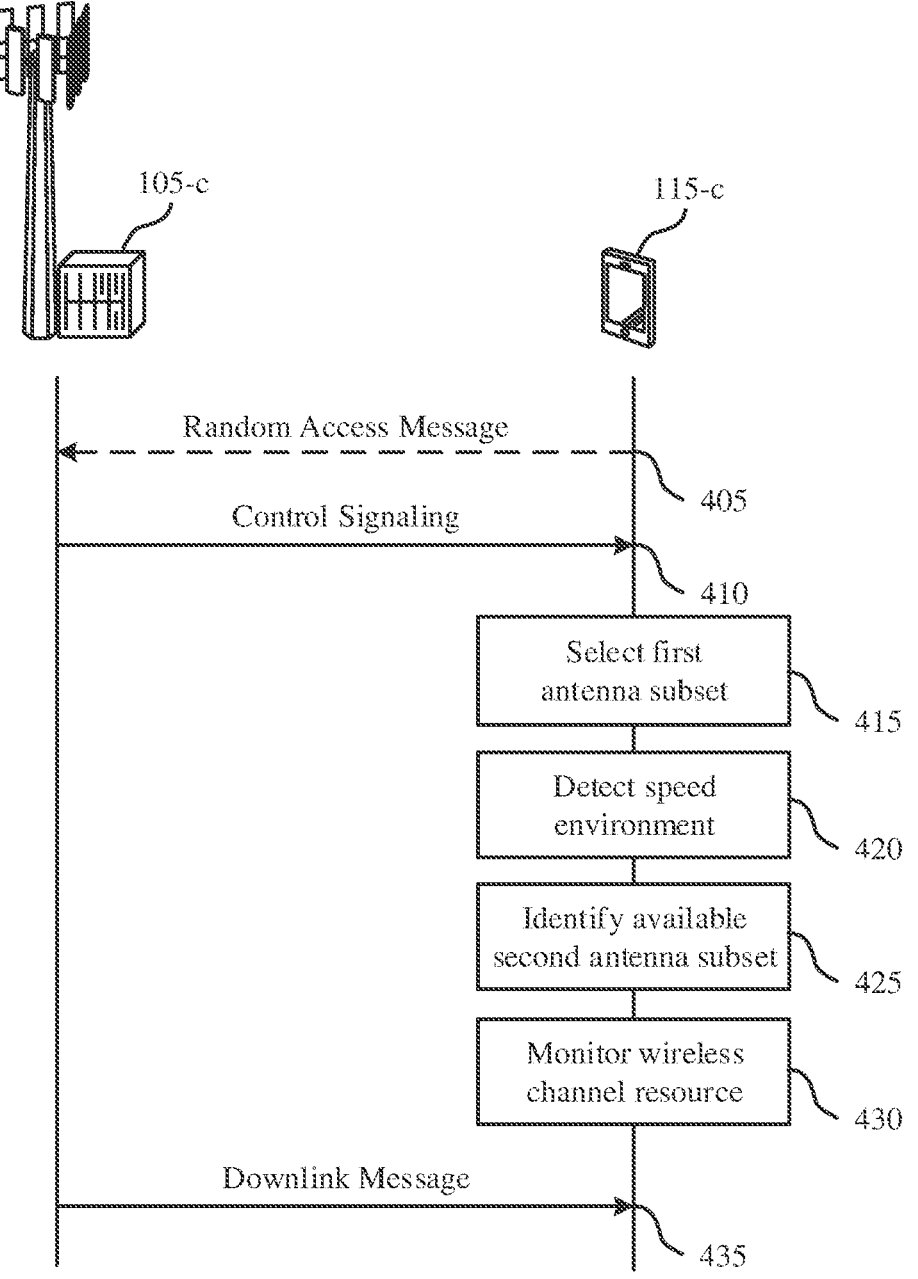
FIG. 4 illustrates an example of a process flow that supports enhance downlink performance by activating receiver antennas in high-speed environment in accordance with aspects of the present disclosure.

FIG. 4 illustrates an example of a process flow 400 that supports enhance downlink performance by activating receiver antennas in high-speed environment in accordance with aspects of the present disclosure.

The process flow 400 may implement various aspects of the present disclosure described with reference to FIGS. 1-3. The process flow 400 may include a base station 105-*c*, and a UE 115-*c*, which may be examples of base station 105 and UE 115 as described with reference to FIGS. 1-3. In some examples, the UE 115-*c* may be configured for one or more techniques for managing downlink performance in a speed scenario.

In the following description of the process flow 400, the operations between the base station 105-*c* and the UE 115-*c* may be performed in different orders or at different times. Some operations may also be left out of the process flow 400, or other operations may be added. Although the base station 105-*d* and the UE 115-*c* are shown performing the operations of the process flow 400, some aspects of some operations may also be performed by one or more other wireless devices.

At 405, the UE 115-*c* may transmit a random access message of a random access procedure.

At 410, the UE 115-*c* may receive, from a base station 105-*c*, control signaling scheduling transmission of a downlink message within a wireless channel resource. For example, the UE 115-*c* may receive DCI scheduling a downlink transmission. In some examples, the downlink message may be a random access response message of the random access procedure. In another example, the control signaling may be MSG 2 indicating a resource for receiving a downlink message that is MSG 4. Additionally, or alternatively, the UE 115-*c* may receive control signaling (e.g.

control signaling that is part of MSG 2 or MSG 4 in a random access procedure) that may indicate a resource for transmission of a random access procedure payload (e.g. MSG 2 payload or MSG 4 payload).

At 415, the UE 115-*c* may select a first antenna subset of a plurality of antennas of the UE 115-*c* to receive the downlink message. For example, the UE 115-*c* may select one or more antennas of a group of antennas available on the UE 115-*c* to receive the scheduled downlink message. In some examples, such a selection may be based on an active power state corresponding to a power consumption level of the UE 115-*c*.

At 420, the UE 115-*c* may detect a speed environment in which the UE 115-*c* may be operating. In some examples, detecting the speed environment may include detecting the speed environment based on a mobility sensor of the UE. In some examples, detecting the speed environment may include receiving network system information indicating that the UE may be operating in the speed environment. In some examples, detecting the speed environment may include receiving a control message (e.g., a SIB message) indicating the speed environment in which the UE 115-*c* may be operating.

At 425, the UE 115-*c* may identify that a second antenna subset of antennas of the plurality of antennas of the UE 115-*c* may be currently available to use for receiving the downlink message based on detecting a speed environment in which the UE 115-*c* may be operating. In some examples, identifying that the second antenna subset of antennas of the plurality of antennas of the UE 115-*c* may be currently available may include identifying that the second antenna subset of antennas of the plurality of antennas of the UE 115-*c* may be currently available to use for receiving the downlink message based on the speed environment in which the UE 115-*c* may be operating being classified as a high-speed environment. In some examples, the UE 115-*c* may identify a maximum number of antennas available at the UE 115-*c* based on a hardware capability of the UE 115-*c*. In some examples, identifying the second antenna subset may be based on identifying the maximum number of antennas of the UE 115-*c*.

At 430, the UE 115-*c* may monitor, for downlink reception of the downlink message, the wireless channel resource using the first antenna subset and one or more antennas of the second antenna subset. In some examples, monitoring the wireless channel resource may include monitoring the wireless channel resource using all antennas of the second antenna subset based on detecting that the UE 115-*c* operating in the speed environment. In some examples, monitoring the wireless channel resource may include monitoring the wireless channel resource using one or more antennas of the second antenna subset that are activated based on the UE 115-*c* operating in an initial access mode. In some examples, monitoring the wireless channel resource may include monitoring the wireless channel resource using one or more antennas of the second antenna subset that are activated based on the UE 115-*c* operating in a connected mode. In some examples, the UE 115-*c* may monitor the wireless channel resource using the maximum number of antennas available at the UE 115-*c*.

At 435, the UE 115-*c* may receive the downlink message using one or more antennas of the first antenna subset, the second antenna subset, or both, based on the monitoring. In some examples, the UE 115-*c* may decode the downlink message based on performing soft-combining of each signal received via the wireless channel resource at a respective antenna of the first antenna subset and the second antenna subset. In some examples, the UE 115-*c* may deactivate one or more antennas of the second antenna subset based on the detecting that the UE 115-*c* may be no longer operating in the speed environment that may be classified as a high-speed environment.

Figure 5:
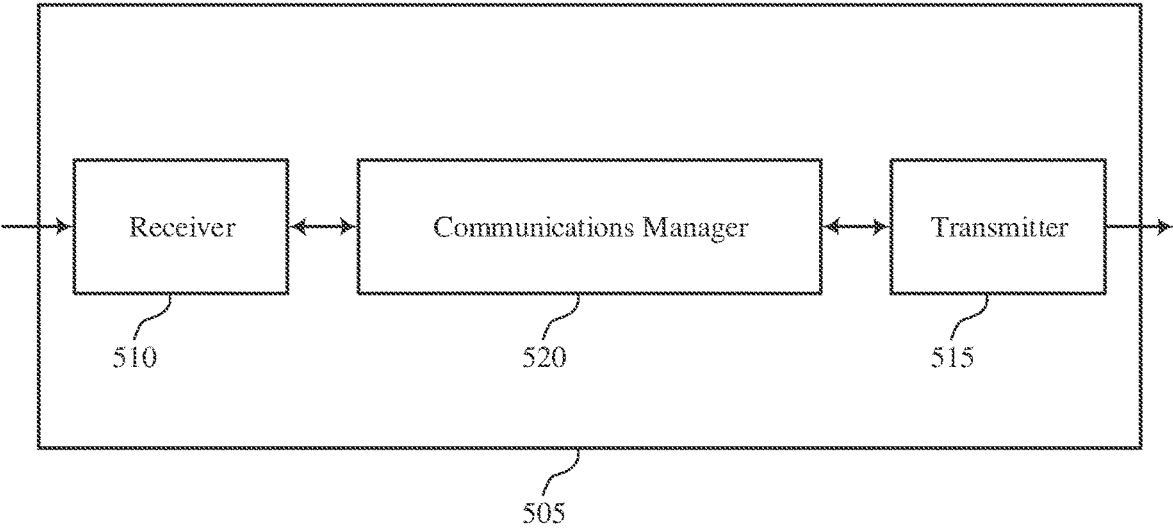
FIGS. 5 and 6 show block diagrams of devices that support enhance downlink performance by activating receiver antennas in high-speed environment in accordance with aspects of the present disclosure.

FIG. 5 shows a block diagram 500 of a device 505 that supports enhance downlink performance by activating receiver antennas in high-speed environment in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to enhance downlink performance by activating receiver antennas in high-speed environment). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enhance downlink performance by activating receiver antennas in high-speed environment). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of enhance downlink performance by activating receiver antennas in high-speed environment as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, control signaling scheduling transmission of a downlink message within a wireless channel resource. The communications manager 520 may be configured as or otherwise support a means for selecting a first antenna subset of a set of multiple antennas of the UE to receive the downlink message. The communications manager 520 may be configured as or otherwise support a means for identifying that a second antenna subset of antennas of the set of multiple antennas of the UE is currently available to use for receiving the downlink message based on detecting a speed environment in which the UE is operating. The communications manager 520 may be configured as or otherwise support a means for monitoring, for downlink reception of the downlink message, the wireless channel resource using the first antenna subset and one or more antennas of the second antenna subset.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources.

Figure 6:
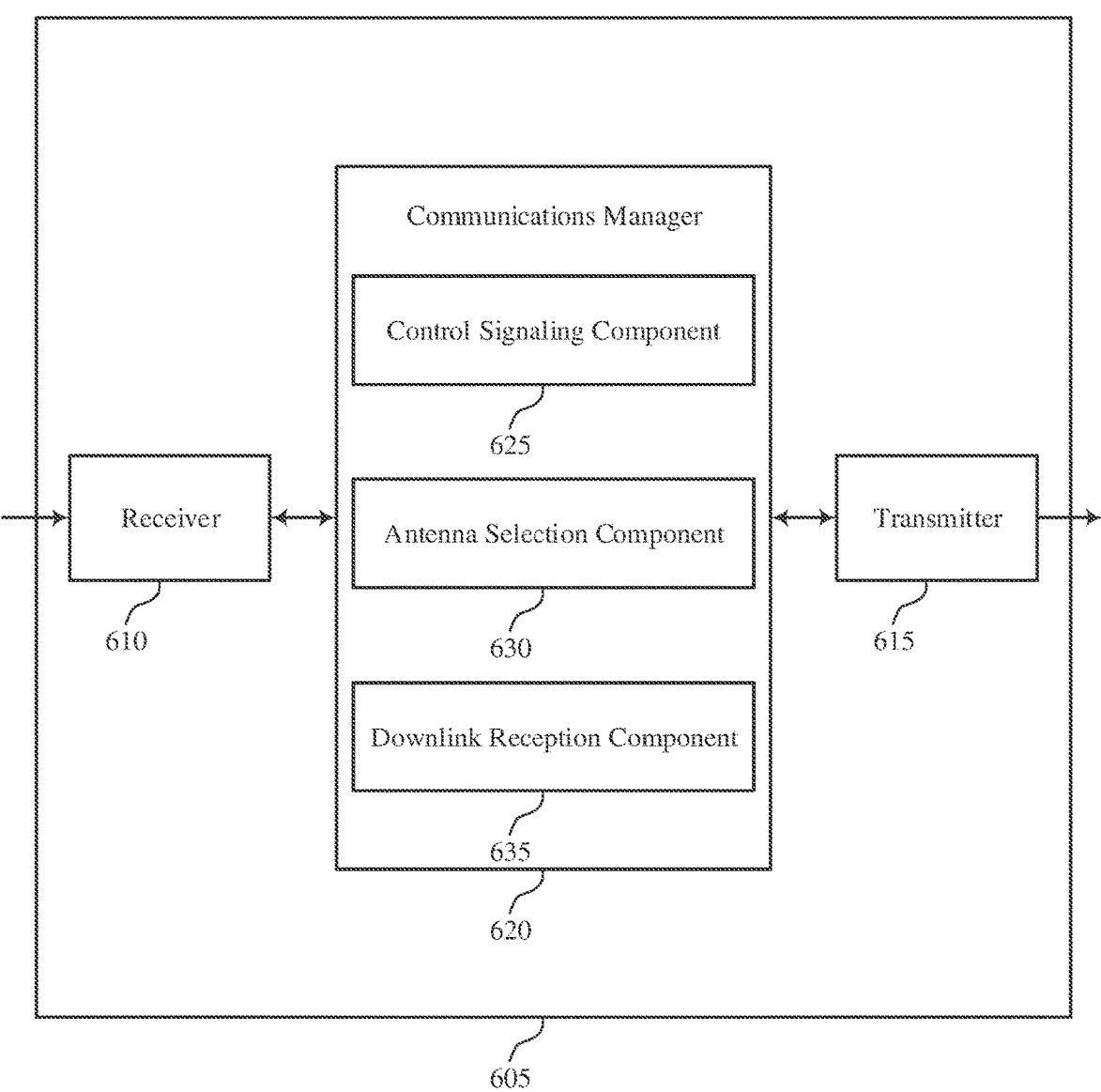

FIG. 6 shows a block diagram 600 of a device 605 that supports enhance downlink performance by activating receiver antennas in high-speed environment in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhance downlink performance by activating receiver antennas in high-speed environment). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhance downlink performance by activating receiver antennas in high-speed environment). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of enhance downlink performance by activating receiver antennas in high-speed environment as described herein. For example, the communications manager 620 may include a control signaling component 625, an antenna selection component 630, a downlink reception component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The control signaling component 625 may be configured as or otherwise support a means for receiving, from a base station, control signaling scheduling transmission of a downlink message within a wireless channel resource. The antenna selection component 630 may be configured as or otherwise support a means for selecting a first antenna subset of a set of multiple antennas of the UE to receive the downlink message. The antenna selection component 630 may be configured as or otherwise support a means for identifying that a second antenna subset of antennas of the set of multiple antennas of the UE is currently available to use for receiving the downlink message based on detecting a speed environment in which the UE is operating. The downlink reception component 635 may be configured as or otherwise support a means for monitoring, for downlink reception of the downlink message, the wireless channel resource using the first antenna subset and one or more antennas of the second antenna subset.

Figure 7:
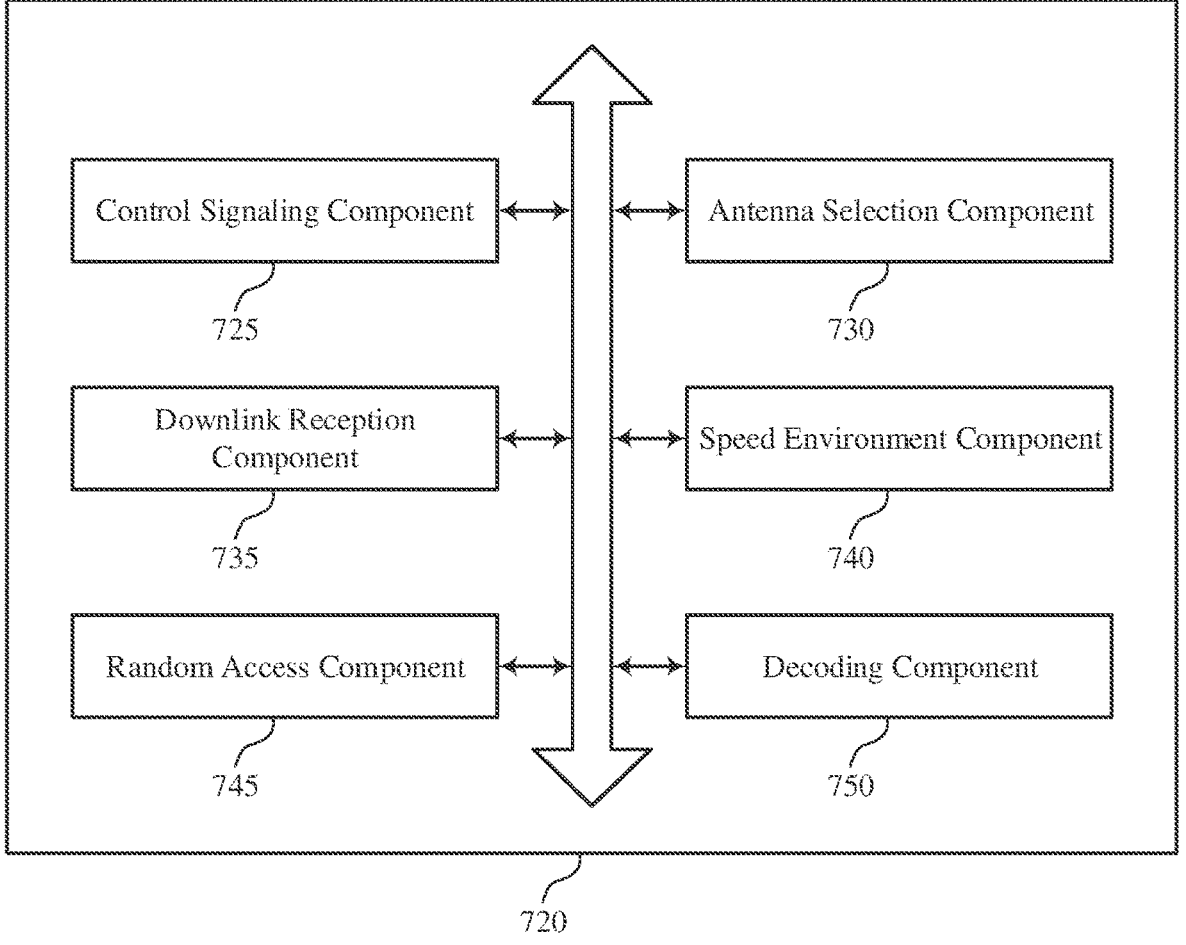
FIG. 7 shows a block diagram of a communications manager that supports enhance downlink performance by activating receiver antennas in high-speed environment in accordance with aspects of the present disclosure.

FIG. 7 shows a block diagram 700 of a communications manager 720 that supports enhance downlink performance by activating receiver antennas in high-speed environment in accordance with aspects of the present disclosure. The communications manager 720 may be an example of aspects of a communications manager 520, a communications manager 620, or both, as described herein. The communications manager 720, or various components thereof, may be an example of means for performing various aspects of enhance downlink performance by activating receiver antennas in high-speed environment as described herein. For example, the communications manager 720 may include a control signaling component 725, an antenna selection component 730, a downlink reception component 735, a speed environment component 740, a random access component 745, a decoding component 750, or any combination thereof. Each of these components may communicate, directly or indirectly, with one another (e.g., via one or more buses).

The communications manager 720 may support wireless communications at a UE in accordance with examples as disclosed herein. The control signaling component 725 may be configured as or otherwise support a means for receiving, from a base station, control signaling scheduling transmission of a downlink message within a wireless channel resource. The antenna selection component 730 may be configured as or otherwise support a means for selecting a first antenna subset of a set of multiple antennas of the UE to receive the downlink message. In some examples, the antenna selection component 730 may be configured as or otherwise support a means for identifying that a second antenna subset of antennas of the set of multiple antennas of the UE is currently available to use for receiving the downlink message based on detecting a speed environment in which the UE is operating. The downlink reception component 735 may be configured as or otherwise support a means for monitoring, for downlink reception of the downlink message, the wireless channel resource using the first antenna subset and one or more antennas of the second antenna subset.

In some examples, to support detecting the speed environment, the speed environment component 740 may be configured as or otherwise support a means for receiving a control message indicating the speed environment in which the UE is operating.

In some examples, the downlink reception component 735 may be configured as or otherwise support a means for receiving the downlink message using one or more antennas of the first antenna subset, the second antenna subset, or both, based on the monitoring.

In some examples, the random access component 745 may be configured as or otherwise support a means for transmitting a random access message of a random access procedure, where the downlink message is a random access response message of the random access procedure.

In some examples, to support monitoring the wireless channel resource, the downlink reception component 735 may be configured as or otherwise support a means for monitoring the wireless channel resource using all antennas of the second antenna subset based on detecting that the UE operating in the speed environment.

In some examples, to support monitoring the wireless channel resource, the downlink reception component 735 may be configured as or otherwise support a means for monitoring the wireless channel resource using one or more antennas of the second antenna subset that are activated based on the UE operating in an initial access mode.

In some examples, to support monitoring the wireless channel resource, the downlink reception component 735 may be configured as or otherwise support a means for monitoring the wireless channel resource using one or more antennas of the second antenna subset that are activated based on the UE operating in a connected mode.

In some examples, to support identifying that the second antenna subset of antennas of the set of multiple antennas of the UE is currently available, the antenna selection component 730 may be configured as or otherwise support a means for identifying that the second antenna subset of antennas of the set of multiple antennas of the UE is currently available to use for receiving the downlink message based on the speed environment in which the UE is operating being classified as a high-speed environment.

In some examples, the antenna selection component 730 may be configured as or otherwise support a means for deactivating one or more antennas of the second antenna subset based on the detecting that the UE is no longer operating in the speed environment that is classified as a high-speed environment.

In some examples, the antenna selection component 730 may be configured as or otherwise support a means for identifying a maximum number of antennas available at the UE based on a hardware capability of the UE. In some examples, the downlink reception component 735 may be configured as or otherwise support a means for monitoring the wireless channel resource using the maximum number of antennas available at the UE. In some examples, identifying the second antenna subset is based on identifying the maximum number of antennas of the UE.

In some examples, to support detecting the speed environment, the speed environment component 740 may be configured as or otherwise support a means for detecting the speed environment based on a mobility sensor of the UE. In some examples, to support detecting the speed environment, the speed environment component 740 may be configured as or otherwise support a means for receiving network system information indicating that the UE is operating in the speed environment.

In some examples, the decoding component 750 may be configured as or otherwise support a means for decoding the downlink message based on performing soft-combining of each signal received via the wireless channel resource at a respective antenna of the first antenna subset and the second antenna subset.

Figure 8:
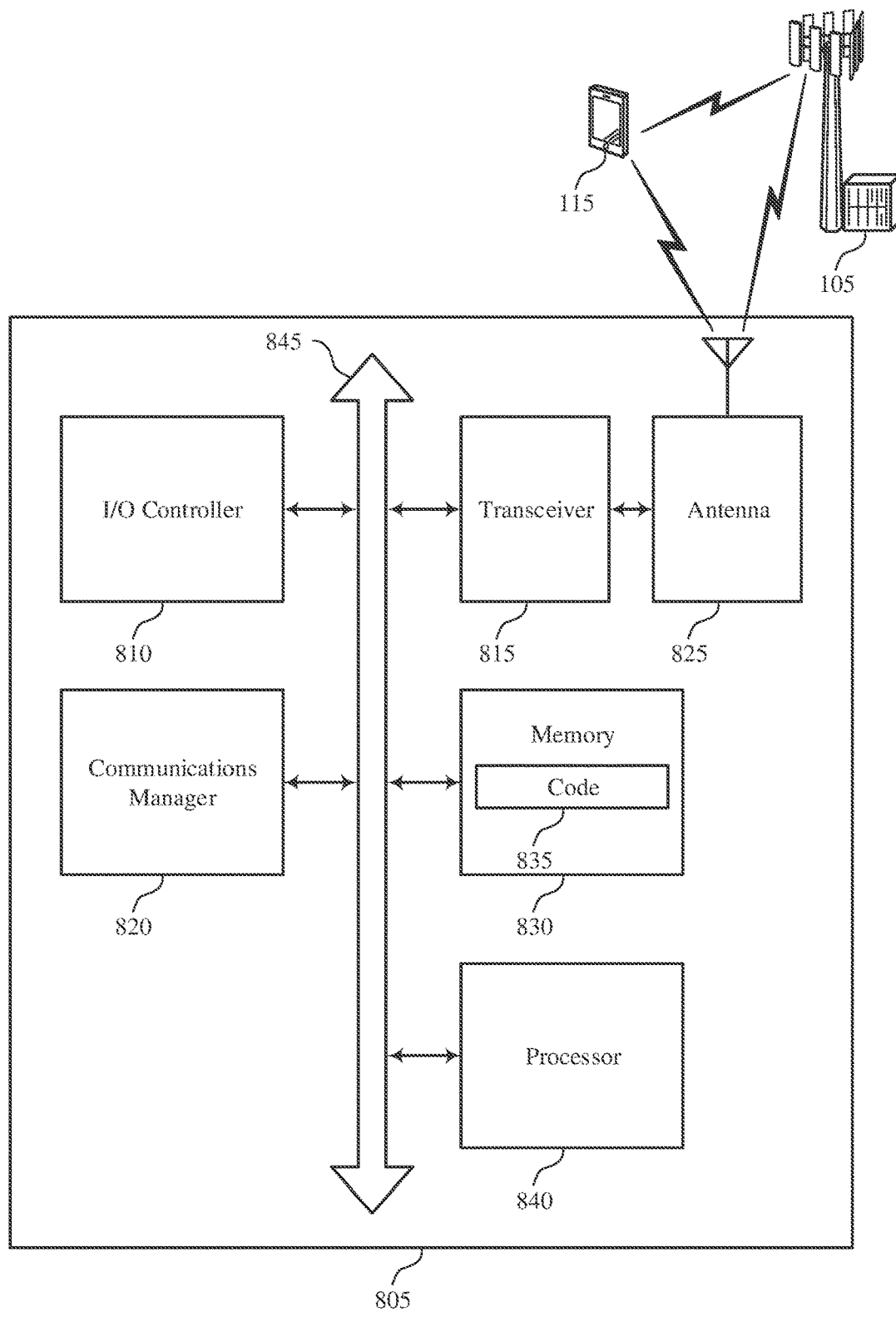
FIG. 8 shows a diagram of a system including a device that supports enhance downlink performance by activating receiver antennas in high-speed environment in accordance with aspects of the present disclosure.

FIG. 8 shows a diagram of a system 800 including a device 805 that supports enhance downlink performance by activating receiver antennas in high-speed environment in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting enhance downlink performance by activating receiver antennas in high-speed environment). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, control signaling scheduling transmission of a downlink message within a wireless channel resource. The communications manager 820 may be configured as or otherwise support a means for selecting a first antenna subset of a set of multiple antennas of the UE to receive the downlink message. The communications manager 820 may be configured as or otherwise support a means for identifying that a second antenna subset of antennas of the set of multiple antennas of the UE is currently available to use for receiving the downlink message based on detecting a speed environment in which the UE is operating. The communications manager 820 may be configured as or otherwise support a means for monitoring, for downlink reception of the downlink message, the wireless channel resource using the first antenna subset and one or more antennas of the second antenna subset.

By including or configuring the communications manager 820 in accordance with examples as described herein, the device 805 may support techniques for improved communication reliability, reduced latency, improved user experience, more efficient utilization of communication resources, improved coordination between devices, or improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of enhance downlink performance by activating receiver antennas in high-speed environment as described herein, or the processor 840 and the memory 830 may be otherwise configured to perform or support such operations.

FIG. 9 shows a flowchart illustrating a method 900 that supports enhance downlink performance by activating receiver antennas in high-speed environment in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving, from a base station, control signaling scheduling transmission of a downlink message within a wireless channel resource. The operations of 905 may be performed in accordance with examples as disclosed herein. In some examples, aspects of the operations of 905 may be performed by a control signaling component 725 as described with reference to FIG. 7.

At 910, the method may include selecting a first antenna subset of a set of multiple antennas of the UE to receive the downlink message. The operations of 910 may be performed in accordance with examples as disclosed herein. In some examples, aspects of the operations of 910 may be performed by an antenna selection component 730 as described with reference to FIG. 7.

At 915, the method may include identifying that a second antenna subset of antennas of the set of multiple antennas of the UE is currently available to use for receiving the downlink message based on detecting a speed environment in which the UE is operating. The operations of 915 may be performed in accordance with examples as disclosed herein. In some examples, aspects of the operations of 915 may be performed by an antenna selection component 730 as described with reference to FIG. 7.

At 920, the method may include monitoring, for downlink reception of the downlink message, the wireless channel resource using the first antenna subset and one or more antennas of the second antenna subset. The operations of 920 may be performed in accordance with examples as disclosed herein. In some examples, aspects of the operations of 920 may be performed by a downlink reception component 735 as described with reference to FIG. 7.

FIG. 10 shows a flowchart illustrating a method 1000 that supports enhance downlink performance by activating receiver antennas in high-speed environment in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, control signaling scheduling transmission of a downlink message within a wireless channel resource. The operations of 1005 may be performed in accordance with examples as disclosed herein. In some examples, aspects of the operations of 1005 may be performed by a control signaling component 725 as described with reference to FIG. 7.

At 1010, the method may include selecting a first antenna subset of a set of multiple antennas of the UE to receive the downlink message. The operations of 1010 may be performed in accordance with examples as disclosed herein. In some examples, aspects of the operations of 1010 may be performed by an antenna selection component 730 as described with reference to FIG. 7.

At 1015, the method may include identifying that a second antenna subset of antennas of the set of multiple antennas of the UE is currently available to use for receiving the downlink message based on detecting a speed environment in which the UE is operating. The operations of 1015 may be performed in accordance with examples as disclosed herein. In some examples, aspects of the operations of 1015 may be performed by an antenna selection component 730 as described with reference to FIG. 7.

At 1020, the method may include identifying that the second antenna subset of antennas of the set of multiple antennas of the UE is currently available to use for receiving the downlink message based on the speed environment in which the UE is operating being classified as a high-speed environment. The operations of 1020 may be performed in accordance with examples as disclosed herein. In some examples, aspects of the operations of 1020 may be performed by an antenna selection component 730 as described with reference to FIG. 7.

At 1025, the method may include monitoring, for downlink reception of the downlink message, the wireless channel resource using the first antenna subset and one or more antennas of the second antenna subset. The operations of 1025 may be performed in accordance with examples as disclosed herein. In some examples, aspects of the operations of 1025 may be performed by a downlink reception component 735 as described with reference to FIG. 7.

Figure 11:
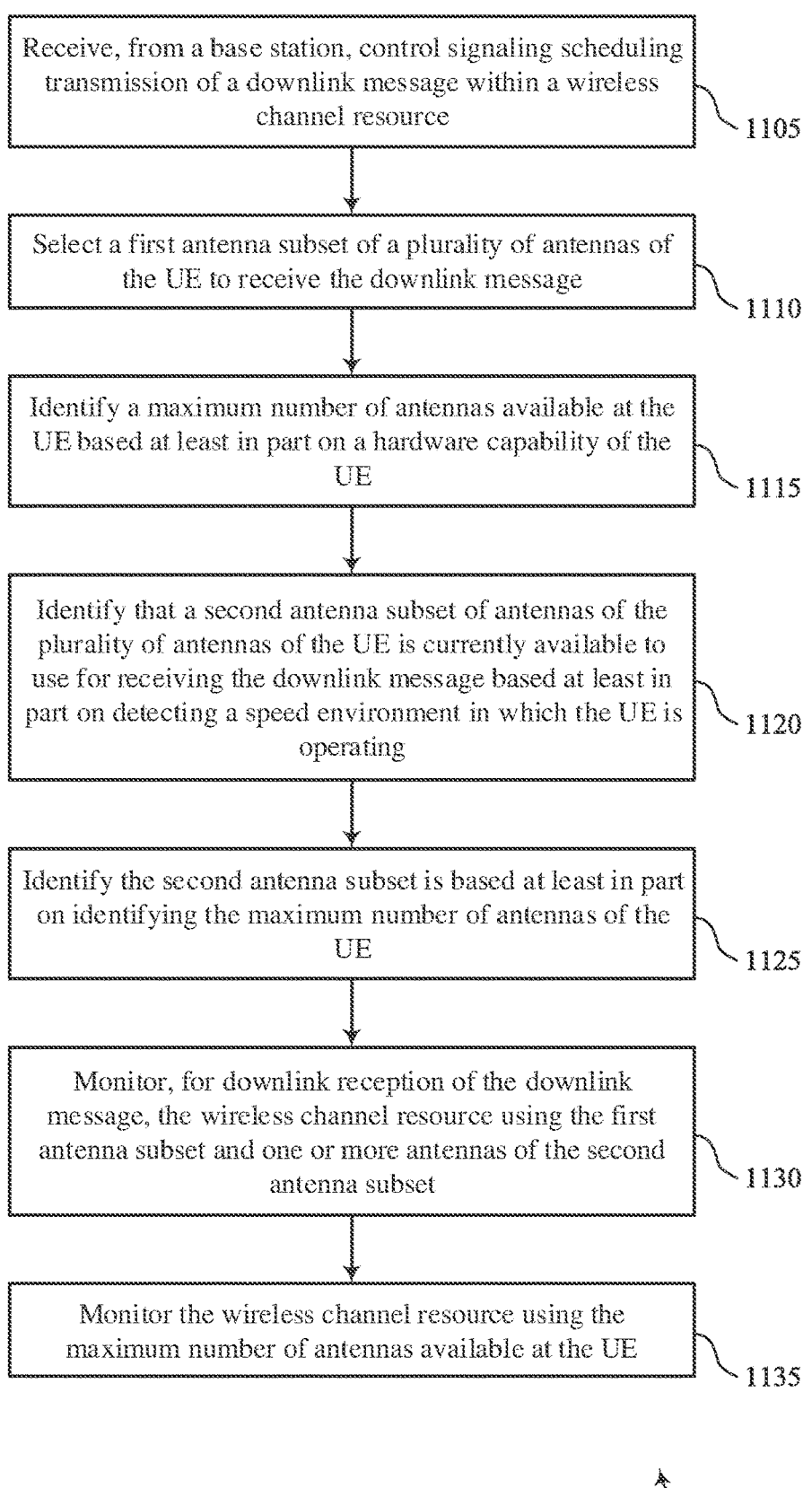

FIG. 11 shows a flowchart illustrating a method 1100 that supports enhance downlink performance by activating receiver antennas in high-speed environment in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, control signaling scheduling transmission of a downlink message within a wireless channel resource. The operations of 1105 may be performed in accordance with examples as disclosed herein. In some examples, aspects of the operations of 1105 may be performed by a control signaling component 725 as described with reference to FIG. 7.

At 1110, the method may include selecting a first antenna subset of a set of multiple antennas of the UE to receive the downlink message. The operations of 1110 may be performed in accordance with examples as disclosed herein. In some examples, aspects of the operations of 1110 may be performed by an antenna selection component 730 as described with reference to FIG. 7.

At 1115, the method may include identifying a maximum number of antennas available at the UE based on a hardware capability of the UE. The operations of 1115 may be performed in accordance with examples as disclosed herein. In some examples, aspects of the operations of 1115 may be performed by an antenna selection component 730 as described with reference to FIG. 7.

At 1120, the method may include identifying that a second antenna subset of antennas of the set of multiple antennas of the UE is currently available to use for receiving the downlink message based on detecting a speed environment in which the UE is operating. The operations of 1120 may be performed in accordance with examples as disclosed herein. In some examples, aspects of the operations of 1120 may be performed by an antenna selection component 730 as described with reference to FIG. 7.

At 1125, the method may include identifying the second antenna subset is based on identifying the maximum number of antennas of the UE. The operations of 1125 may be performed in accordance with examples as disclosed herein. In some examples, aspects of the operations of 1125 may be performed by an antenna selection component 730 as described with reference to FIG. 7.

At 1130, the method may include monitoring, for downlink reception of the downlink message, the wireless channel resource using the first antenna subset and one or more antennas of the second antenna subset. The operations of 1130 may be performed in accordance with examples as disclosed herein. In some examples, aspects of the operations of 1130 may be performed by a downlink reception component 735 as described with reference to FIG. 7.

At 1135, the method may include monitoring the wireless channel resource using the maximum number of antennas available at the UE. The operations of 1135 may be performed in accordance with examples as disclosed herein. In some examples, aspects of the operations of 1135 may be performed by a downlink reception component 735 as described with reference to FIG. 7.

The following provides an overview of aspects of the present disclosure:

Aspect 1: A method for wireless communications at a UE, comprising: receiving, from a base station, control signaling scheduling transmission of a downlink message within a wireless channel resource; selecting a first antenna subset of a plurality of antennas of the UE to receive the downlink message; identifying that a second antenna subset of antennas of the plurality of antennas of the UE is currently available to use for receiving the downlink message based at least in part on detecting a speed environment in which the UE is operating; monitoring, for downlink reception of the downlink message, the wireless channel resource using the first antenna subset and one or more antennas of the second antenna subset.

Aspect 2: The method of aspect 1, wherein detecting the speed environment comprises: receiving a control message indicating the speed environment in which the UE is operating.

Aspect 3: The method of any of aspects 1 through 2 further comprising: receiving the downlink message using one or more antennas of the first antenna subset, the second antenna subset, or both, based at least in part on the monitoring.

Aspect 4: The method of any of aspects 1 through 3, further comprising: transmitting a random access message of a random access procedure, wherein the downlink message is a random access response message of the random access procedure.

Aspect 5: The method of any of aspects 1 through 4, wherein monitoring the wireless channel resource further comprises: monitoring the wireless channel resource using all antennas of the second antenna subset based at least in part on detecting that the UE operating in the speed environment.

Aspect 6: The method of any of aspects 1 through 5, wherein monitoring the wireless channel resource further comprises: monitoring the wireless channel resource using one or more antennas of the second antenna subset that are activated based at least in part on the UE operating in an initial access state.

Aspect 7: The method of any of aspects 1 through 6, wherein monitoring the wireless channel resource further comprises: monitoring the wireless channel resource using one or more antennas of the second antenna subset that are activated based at least in part on the UE operating in a connected state.

Aspect 8: The method of any of aspects 1 through 7, wherein identifying that the second antenna subset of antennas of the plurality of antennas of the UE is currently available further comprises: identifying that the second antenna subset of antennas of the plurality of antennas of the UE is currently available to use for receiving the downlink message based at least in part on the speed environment in which the UE is operating being classified as a high-speed environment.

Aspect 9: The method of any of aspects 1 through 8, further comprising: deactivating one or more antennas of the second antenna subset based at least in part on the detecting that the UE is no longer operating in the speed environment that is classified as a high-speed environment.

Aspect 10: The method of any of aspects 1 through 9, further comprising: identifying a maximum number of antennas available at the UE based at least in part on a hardware capability of the UE; and monitoring the wireless channel resource using the maximum number of antennas available at the UE.

Aspect 11: The method of aspect 10, wherein identifying the second antenna subset is based at least in part on identifying the maximum number of antennas of the UE.

Aspect 12: The method of any of aspects 1 through 11, wherein detecting the speed environment comprises: detecting the speed environment based at least in part on a mobility sensor of the UE.

Aspect 13: The method of any of aspects 1 through 12, wherein detecting the speed environment comprises: receiving network system information indicating that the UE is operating in the speed environment.

Aspect 14: The method of any of aspects 1 through 13, further comprising: decoding the downlink message based at least in part on performing soft-combining of each signal received via the wireless channel resource at a respective antenna of the first antenna subset and the second antenna subset.

Aspect 15: An apparatus for wireless communications at a UE, comprising a processor; memory coupled with the processor; and instructions stored in the memory and executable by the processor to cause the apparatus to perform a method of any of aspects 1 through 14.

Aspect 16: An apparatus for wireless communications at a UE, comprising at least one means for performing a method of any of aspects 1 through 14.

Aspect 17: A non-transitory computer-readable medium storing code for wireless communications at a UE, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, control signaling scheduling transmission of a downlink message within a wireless channel resource;
   selecting a first antenna subset of a plurality of antennas of the UE to receive the downlink message;
   identifying that a second antenna subset of antennas of the plurality of antennas of the UE is currently available to use for receiving the downlink message based at least in part on detecting a speed environment in which the UE is operating, wherein detecting the speed environment includes receiving a control message indicating the speed environment; and
   monitoring, for downlink reception of the downlink message, the wireless channel resource using the first antenna subset and one or more antennas of the second antenna subset.

2. The method of claim 1 further comprising:
   receiving the downlink message using one or more antennas of the first antenna subset, the second antenna subset, or both, based at least in part on the monitoring.

3. The method of claim 1, further comprising:
   transmitting a random access message of a random access procedure, wherein the downlink message is a random access response message of the random access procedure.

4. The method of claim 1, wherein monitoring the wireless channel resource further comprises:
   monitoring the wireless channel resource using all antennas of the second antenna subset based at least in part on detecting that the UE operating in the speed environment.

5. The method of claim 1, wherein monitoring the wireless channel resource further comprises:
   monitoring the wireless channel resource using one or more antennas of the second antenna subset that are activated based at least in part on the UE operating in an initial access state.

6. The method of claim 1, wherein monitoring the wireless channel resource further comprises:
   monitoring the wireless channel resource using one or more antennas of the second antenna subset that are activated based at least in part on the UE operating in a connected state.

7. The method of claim 1, wherein identifying that the second antenna subset of antennas of the plurality of antennas of the UE is currently available further comprises:
   identifying that the second antenna subset of antennas of the plurality of antennas of the UE is currently available to use for receiving the downlink message based at least in part on the speed environment in which the UE is operating being classified as a high-speed environment.

8. The method of claim 1, further comprising:
   deactivating one or more antennas of the second antenna subset based at least in part on the detecting that the UE is no longer operating in the speed environment that is classified as a high-speed environment.

9. The method of claim 1, further comprising:
   identifying a maximum number of antennas available at the UE based at least in part on a hardware capability of the UE; and
   monitoring the wireless channel resource using the maximum number of antennas available at the UE.

10. The method of claim 9, wherein identifying the second antenna subset is based at least in part on identifying the maximum number of antennas of the UE.

11. The method of claim 1, wherein detecting the speed environment comprises:
   detecting the speed environment based at least in part on a mobility sensor of the UE.

12. The method of claim 1, further comprising:
   decoding the downlink message based at least in part on performing soft-combining of each signal received via the wireless channel resource at a respective antenna of the first antenna subset and the second antenna subset.

13. An apparatus for wireless communications at a user equipment (UE), comprising:
   one or more processors;
   memory coupled with the one or more processors; and
   instructions stored in the memory and executable by the one or more processors to cause the apparatus to:
      receive, from a base station, control signaling scheduling transmission of a downlink message within a wireless channel resource;
      select a first antenna subset of a plurality of antennas of the UE to receive the downlink message;
      identify that a second antenna subset of antennas of the plurality of antennas of the UE is currently available to use for receiving the downlink message based at least in part on detection of a speed environment in which the UE is operating, wherein detection of the speed environment includes reception of a control message indicating the speed environment; and
      monitor, for downlink reception of the downlink message, the wireless channel resource using the first antenna subset and one or more antennas of the second antenna subset.

14. The apparatus of claim 13, wherein the instructions are further executable by the one or more processors to cause the apparatus to:
   receive the downlink message using one or more antennas of the first antenna subset, the second antenna subset, or both, based at least in part on the monitoring.

15. The apparatus of claim 13, wherein the instructions are further executable by the one or more processors to cause the apparatus to:
   transmit a random access message of a random access procedure, wherein the downlink message is a random access response message of the random access procedure.

16. The apparatus of claim 13, wherein the instructions to monitor the wireless channel resource are further executable by the one or more processors to cause the apparatus to:

monitor the wireless channel resource using all antennas of the second antenna subset based at least in part on detecting that the UE operating in the speed environment.

17. The apparatus of claim 13, wherein the instructions to monitor the wireless channel resource are further executable by the one or more processors to cause the apparatus to:

monitor the wireless channel resource using one or more antennas of the second antenna subset that are activated based at least in part on the UE operating in an initial access state.

18. The apparatus of claim 13, wherein the instructions to monitor the wireless channel resource are further executable by the one or more processors to cause the apparatus to:

monitor the wireless channel resource using one or more antennas of the second antenna subset that are activated based at least in part on the UE operating in a connected state.

19. The apparatus of claim 13, wherein the instructions to identify that the second antenna subset of antennas of the plurality of antennas of the UE is currently available are further executable by the one or more processors to cause the apparatus to:

identify that the second antenna subset of antennas of the plurality of antennas of the UE is currently available to use for receiving the downlink message based at least in part on the speed environment in which the UE is operating being classified as a high-speed environment.

20. The apparatus of claim 13, wherein the instructions are further executable by the one or more processors to cause the apparatus to:

deactivate one or more antennas of the second antenna subset based at least in part on the detecting that the UE is no longer operating in the speed environment that is classified as a high-speed environment.

21. The apparatus of claim 13, wherein the instructions are further executable by the one or more processors to cause the apparatus to:

identify a maximum number of antennas available at the UE based at least in part on a hardware capability of the UE; and monitor the wireless channel resource using the maximum number of antennas available at the UE.

22. The apparatus of claim 21, wherein identifying the second antenna subset is based at least in part on identifying the maximum number of antennas of the UE.

23. The apparatus of claim 13, wherein the instructions to detect the speed environment are executable by the one or more processors to cause the apparatus to:

detect the speed environment based at least in part on a mobility sensor of the UE.

24. The apparatus of claim 13, wherein the instructions are further executable by the one or more processors to cause the apparatus to:

decode the downlink message based at least in part on performing soft-combining of each signal received via the wireless channel resource at a respective antenna of the first antenna subset and the second antenna subset.

25. A non-transitory computer-readable medium storing code for wireless communications at a user equipment (UE), the code comprising instructions executable by one or more processors to:

receive, from a base station, control signaling scheduling transmission of a downlink message within a wireless channel resource;

select a first antenna subset of a plurality of antennas of the UE to receive the downlink message;

identify that a second antenna subset of antennas of the plurality of antennas of the UE is currently available to use for receiving the downlink message based at least in part on detection of a speed environment in which the UE is operating, wherein detection of the speed environment includes reception of a control message indicating the speed environment; and monitor, for downlink reception of the downlink message, the wireless channel resource using the first antenna subset and one or more antennas of the second antenna subset.

26. The non-transitory computer-readable medium of claim 25, wherein the instructions to identify that the second antenna subset of antennas of the plurality of antennas of the UE is currently available are further executable by the one or more processors to:

identify that the second antenna subset of antennas of the plurality of antennas of the UE is currently available to use for receiving the downlink message based at least in part on the speed environment in which the UE is operating being classified as a high-speed environment.

* * * * *